US007750107B2

(12) United States Patent
Antelmann et al.

(10) Patent No.: US 7,750,107 B2
(45) Date of Patent: Jul. 6, 2010

(54) SUBSTITUTED UREA ACCELERATOR WITH DICYANDIAMIDE FOR EPOXY RESIN SYSTEMS

(75) Inventors: Björn Antelmann, Zurich (CH); Sylvia Huber, Altenmarkt (DE); Thomas Güthner, Trostberg (DE)

(73) Assignee: Alzchem Trostberg GmbH, Trostberg (DE)

( * ) Notice: Subject to any disclaimer, the term of this patent is extended or adjusted under 35 U.S.C. 154(b) by 432 days.

(21) Appl. No.: 10/558,160

(22) PCT Filed: May 28, 2004

(86) PCT No.: PCT/EP2004/005787

§ 371 (c)(1), (2), (4) Date: Sep. 5, 2006

(87) PCT Pub. No.: WO2004/106402

PCT Pub. Date: Dec. 9, 2004

(65) Prior Publication Data

US 2007/0027274 A1    Feb. 1, 2007

(30) Foreign Application Priority Data

May 30, 2003  (DE)  ................................. 103 24 486

(51) Int. Cl.
  C08G 59/50  (2006.01)
  C08L 63/00  (2006.01)
  C08L 63/02  (2006.01)
(52) U.S. Cl. ...................................... 528/120; 525/123
(58) Field of Classification Search ........................ None
  See application file for complete search history.

(56) References Cited

U.S. PATENT DOCUMENTS 6,403,222 B1 *  6/2002  Harrison ..................... 428/418

FOREIGN PATENT DOCUMENTS

| JP | 49-93495 A  | * | 10/1972 |
| JP | 54-26000 A  | * | 2/1979 |
| JP | 56-93748 A  |   | 7/1981 |
| JP | 56-133856 A | * | 10/1981 |
| JP | 1-87667 A   | * | 3/1989 |
| JP | 05-209110   |   | 8/1993 |
| JP | 5-209110 A  | * | 8/1993 |
| JP | 10182794 A  |   | 11/2005 |

OTHER PUBLICATIONS

CAS accession No. 1924:651, Duval, "Permeability of red blood cells to certain sulfur derivatives of urea," Comptes Rendus des Seances de la Societe de Biologie et de Ses Filiales, vol. 88, 1923, and CAS registry No. 598-94-7 for N,N-dimethylurea, two pages.*
Sigma-Aldrich, N,N'-dimethylurea, 2009, one page.*
CAPLUS accession No. 1989:516520 for Japanese Patent No. 1-87667, Nakagawa et al., Mar. 31, 1989, one page.*
CAS registry No. 598-94-7 for N,N-dimethylurea, 1989, one page.*
Huang Jifu et al., Studies on the Characterization of Ureas as Latent Accelerators for Dycyandiamide-Cured Epoxy Resin, ACTA Polymerica Sinica, No. 3, Jun. 1989.
Database WPI, Section Ch, Week 199837, Derwent Publications Ltd., London, GB, AN 1998-433957, XP002305388 & JP 10 182794 A (Toto Kasei KK), Jul. 7, 1998 abstract.
Zhang B-L et al., A Study on Properties of Epoxy Resin Toughened by Functionalized Polymer Containing Rigid, Rod-Like Moiety, European Polymer Journal, Pergamon Press Ltd.,, Oxford, GB, vol. 36, No. 1, Jan. 2000, pp. 205-213, XP004251530, ISSN: 0014-3057, p. 209, right-hand col., p. 210, left-hand col.
Air Products and Chemicals, Inc., Epoxy Additives for Adhesives Applications. 2001, 19 pages.
English Language Translation of JP-56-093748, Jul. 29, 1981.
English Language Abstract of JP-56-093748, Jul. 29, 1981.
English Abstract of JP 05-209110, Hitachi Chem Co. Ltd., Aug. 20, 1993.

* cited by examiner

*Primary Examiner*—Robert Sellers
(74) *Attorney, Agent, or Firm*—Cook Alex Ltd.

(57) ABSTRACT

A description is given of the use of asymmetrically substituted urea derivatives of the general formula (I)

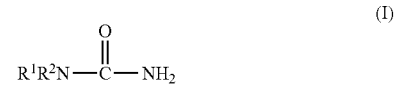

where $R^1$ and $R^2$ each independently are a linear or branched aliphatic hydrocarbon radical having 1 to 4 carbon atoms as accelerators in combination with dicyandiamide as latent hardener for epoxy resin systems based on unhalogenated or halogenated bisphenols of type A or F and also based on resorcinol or tetrakisphenylolethane. The advantages of the inventively proposed accelerator/hardener combination are, for example, the excellent reactivity and very good storage stability. Moreover, the mechanical properties of the resins cured accordingly are likewise outstanding.

7 Claims, No Drawings

SUBSTITUTED UREA ACCELERATOR WITH DICYANDIAMIDE FOR EPOXY RESIN SYSTEMS

The use of epoxy resins is widespread, owing to their outstanding properties such as, for example, high impact strength and abrasion resistance and good chemical stability, and finds use in numerous sectors. Epoxy resins exhibit outstanding adhesiveness and electrical insulation capacity. They serve, for example, as a matrix for fiber composites, in the context, for example, of the building of wind power installations, and as structural components in the air travel sector. In electronics they are employed as electrical laminates in printed circuit boards. Furthermore, they are widespread in use as structural adhesives, as casting varnishes, and as powder coating resins.

The curing of epoxy resins proceeds in accordance with a variety of mechanisms. Besides curing with phenols or anhydrides, curing with amines is described very frequently for the crosslinking of the epoxide groups. The stoichiometric amount of hydrogen atoms is added, as may be supplied, for example, by bifunctional amines. A further mechanism describes the reaction of an initiator or accelerator with epoxide groups, forming a highly reactive intermediate which is able to react with further epoxide groups without the need for further crosslinkers. The initiators may also lower the activation energy of the reaction of crosslinker or hardener molecules, so that the curing temperatures are lowered considerably. Compounds which have these properties are, in general, tertiary amines, imidazoles or else substituted ureas, which have the ability, for example, to reduce the cure temperature of dicyandiamide.

Usually the individual components of epoxy resin formulations are not mixed together until immediately before curing and heating, in order to prevent premature reaction. In this case the resin and, separately therefrom, a mixture of hardener and accelerator are combined and then reacted by heating. A disadvantage of these two component mixtures is a relatively short pot life, i.e., a relatively short time within which the mixture can be processed. Likewise, errors in mixing may lead to inhomogeneous products and hence to unsatisfactory results. One-component mixtures include, besides resin and further constituents (such as fillers, thixotroping agents, pigments, etc.), a hardener which is latent at room temperature, and they have a significantly longer pot life and require, for their curing, elevated temperatures, in particular above 1 00° C, and usually longer cure times. A typical example of a latent hardener is dicyandiamide (cf. EP 148 365 A1, U.S. Pat. No. 2,637,715 B1). In order to overcome these disadvantages, chemically latent accelerators are added to such one-component mixtures, with reductions in storage stability and processing time being accepted, in order to lower the temperature of curing. Examples of latent accelerators of this kind include, in particular, urons, such as 3-(3,4-dichlorophenyl)-1,1-dimethylurea (diuron) (cf. GB 1,153,639 A1, GB 1,293,142 A1, U.S. Pat. No. 3,386,956 B1, U.S. Pat. No. 6,231,959 B1). These compounds are usually 1,1-dialkyl-3-arylureas, where the aromatic may be substituted or unsubstituted, or else is hydrogenated. At elevated temperatures these compounds release dimethylamine and the aryl isocyanate, which synergistically accelerate the curing reaction with dicyandiamide. Hence it is possible to effect curing at significantly lower temperatures. The temperature at which this dissociation of the uron begins, and hence at which the crosslinking reaction commences, depends on the nature of the substituents. At the same time it is found that, the lower the temperature at which curing commences, the lower, too, is the stability of such a mixture at temperatures below the cure temperature.

The aryl-substituted urons employed to date have only a limited stability in the mixture; in other words, there continues to be a need for new accelerators which have the capacity for long storage stability and processing stability in combination with high reactivity. Additionally the mechanical properties of the cured polymer ought not to be substantially impaired as a result of the addition of the accelerator.

Many of the compounds employed as latent accelerators exhibit inadequate solubility in common solvents, thereby significantly reducing their spectrum of application, particularly in sectors in which a uniform reaction is needed. Some of the uron accelerators employed are halogen-substituted, which also limits their use in the electronics sector.

It was an object of the present invention, therefore, to provide latent accelerators for epoxy resin systems that do not have the stated disadvantages of the prior art. By latent accelerators are meant additives to a resin/hardener mixture that as far as possible do not lower the pot life, i.e., the time within which the mixture can be processed, and at the same time accelerate the reactivity, i.e., the crosslinking at elevated temperature. Compounds are desired, therefore, which allow a processing duration which is as long as possible. The accelerators of the invention for epoxy resin systems ought, consequently, to possess a high reactivity and very good storage stability at room temperature and at temperatures below the cure temperatures and ought, furthermore, as far as possible to be halogen-free and toxicologically unobjectionable.

This object has been achieved in accordance with the invention by using as accelerators asymmetrically substituted urea derivatives of the general formula (I)

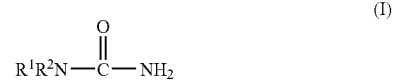

(I)

where $R^1$ and $R^2$ each independently are a linear or branched aliphatic hydrocarbon radical having 1 to 4 carbon atoms.

$R^1$ and $R^2$ may be, for example, methyl, ethyl, propyl and butyl. Examples of such urea derivatives are, for example, N,N-diethylurea, N,N-dipropylurea, N,N-ethyl-methylurea and N,N-dimethylurea. A preferred urea derivative is N,N-dimethylurea.

It has surprisingly been found that the accelerators proposed in accordance with the invention not only have a very good reactivity and storage stability but also exert no negative effect whatsoever on the mechanical properties of the cured material.

It is true that the use of dimethylurea as an accelerator in combination with dicyandiamide is recommended by JP-A 79-26000 for urethane-modified epoxy resin systems; however, the storage stabilities in those formulations are only comparable with those achieved using (1,1'-methylenedi-p-phenylene)bis(3,3-dimethylurea) (=MDI uron). Surprisingly, with the asymmetrically substituted urea derivatives in the epoxy resin systems claimed in accordance with the invention, it has been possible to obtain substantially better storage stabilities than is possible with MDI uron.

Additionally, JP-A 81-133856, which describes the combination of N,N-dimethylurea with phenol novolaks as hardeners for epoxy resin systems in the semiconductor systems sector, contains no indication of the influence of N,N-dimethylurea on the storage stability of the corresponding epoxy resin formulations.

In accordance with the invention accelerators used in combination with dicyandiamide as latent hardener are asymmetrically substituted urea derivatives of the general formula (I)

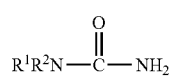

where $R^1$ and $R^2$ each independently are a linear or branched aliphatic hydrocarbon radical having 1 to 4 carbon atoms. Suitable in this context are methyl, ethyl, propyl, and butyl radicals, which may be linear or else, where appropriate, may be branched. Examples of urea derivatives of the invention are, N,N-dimethylurea, N,N-diethylurea, N,N-dipropylurea, and N,N-ethylmethylurea. The urea derivative N,N-dimethylurea is used with preference.

It is regarded as being essential to the invention that the inventively proposed combination of asymmetrically substituted urea derivatives and dicyandiamide are used for the following epoxy resin systems: epoxy resins based on unhalogenated or halogenated bisphenols of type A or F and also based on resorcinol or tetrakisphenylolethane.

Epoxy resins based on bisphenol A and F are used predominantly in the sector of fiber composites, of adhesives, and also, in relatively high molecular mass form, as solid resins in powder coating materials.

In the sector of electrical laminates the cured epoxy resin is expected to exhibit particular flame retardance and high temperature stability. For this purpose use is made predominantly of halogenated systems of bisphenol A, examples being tetrabromobisphenol A derivatives or trifluoromethyl-substituted versions thereof.

Particularly flame-retardant composites are produced, for example with epoxy resins based on resorcinol and tetrakisphenylolethane.

The proportions of dicyandiamide and urea derivative relative to the corresponding epoxy resin may be varied within wide limits. It has, however, proven particularly advantageous to use the dicyandiamide in an amount of about 1% to 15%, preferably about 2% to 12%, more preferably about 2% to 8%, by weight based on the epoxy resin. The urea derivative is used in an amount of about 0.5% to 15%, preferably about 1% to 12%, by weight based on the epoxy resin. A particularly preferred amount is about 1% to 10% by weight based on the epoxy resin.

According to one preferred embodiment the urea derivative and the dicyandiamide are employed in a very finely divided form, the components having a preferred average particle size of about 0.5 to 100 μm, in particular about 10 to 50 μm, more preferably about 2 to 10 μm. The curing reaction of the inventively proposed accelerators and hardeners with the respective epoxy resins can be carried out in accordance with the customary methods, with curing being carried out at temperatures between about 70 and 220° C., in particular between about 80 and 160° C.

The inventively claimed combination of urea derivative as accelerator and dicyandiamide as latent hardener is outstandingly suitable, for example, for the hot curing of epoxy resin in the sector of fiber composites, powder coatings, electrical laminates and adhesives.

The advantages of the accelerator/hardener combination of the invention are the excellent reactivity and very good storage stability. Surprisingly, the mechanical properties of the resins cured accordingly, as well, are likewise outstanding and are comparable with those of the blocked accelerators UR 200 (diuron) and UR 300 (fenuron) which have already been employed.

On the basis of these very good performance properties and a low toxicity, the inventively proposed hardener/accelerator systems are outstandingly suitable for technical use.

The examples which follow are intended to illustrate the invention.

EXAMPLES

The following products and materials were used in the examples:

Epoxy Resins:

Epikote 828 (Resolution): bisphenol A resin, EEW 185

DEH 664 UE (Dow): solid resin, EEW 910 (resin)

Hardener:

Dyhard 100 S (Degussa): micronized dicyandiamide, particle size 98% <10 μm, 50% approx. 2.5 μm (Dyh 100 S)

Accelerators:

Dyhard UR 200 (Degussa): micronized diuron or 3-(3,4-dichlorophenyl)-1,1-dimethylurea, particle size 98% <10 μm, 50% approx. 2.5 μm (UR 200)

Dyhard UR 300 (Degussa): micronized fenuron or 3-phenyl-1,1-dimethylurea, particle size 98% <10 μm, 50% approx. 2.5 μm (UR 300)

Dyhard UR 500 (Degussa): micronized TID uron or toluyl-bis-1,1-dimethylurea, particle size 98% <10 μm, 50% approx. 2.5 μm (UR 500)

Dyhard MIA 5 (Degussa): micronized adduct of methylimidazole with bisphenol A resin (Epikote 828), particle size 98% <70 μm N,N-dimethylurea or 1,1-dimethylurea (Merck): ground in the laboratory, particle size 98% <10 μm, 50% approx. 2.5 μm (1,1-DMH)

N,N-diethylurea or 1,1-diethylurea (Merck): ground in the laboratory, particle size 98% <10 μm, 50% approx. 2.5 μm (1,1-DEH)

MDI uron, (1,1'-methylenedi-p-phenylene)bis(3,3-dimethylurea), was prepared by known methods from MDI (1,1'-methylenedi-p-phenylene) diisocyanate and dimethylamine (e.g., EP 402 020 A1, CS 233 068 B1) and subsequently ground in the laboratory, particle size 98% <10 μm, 50% approx. 2.5 μm Additive:

Lanco Wax TPS 040 (Lubrizol), micronized in the laboratory 98% <80 μm

Example 1

Inventive 5 g in each case of a formulation, corresponding to the composition in the second column from the left in Table I ("Components"), made up of bisphenol A resin (Epikote 828, EEW 185), Dyhard 100 S as hardener, and inventive accelerator 1,1-dimethylurea (1,1-DMH) or 1,1-diethylurea (1,1-DEH), and also as a comparison thereto, formulations which correspond to the compositions of the second column from the left in Table 2 ("Components") and which include the noninventive standard uron accelerators Dyhard UR 200 (diuron) and UR 300 (fenuron), were produced. A measurement was made in each case of the gel time at the stated temperature and the reactivity was determined by means of DSC.

As the temperature program for determining the peak temperature (DSC peak), heating took place at a rate of 10° C./min from 30 to 350° C. The onset of reaction (DSC onset) was determined from the same measurement by applying the tangent to the reaction peak.

For determining the glass transition temperature (Tg) the material from the gel time determination at 120° C. was employed. The formulation was fully cured by heating to 200° C. (temperature program: 30 to 200° C., heating rate 20° C./min) and maintaining this temperature for 30 minutes. After cooling to room temperature (RT) the sample was heated from 30 to 200° C. with a heating rate of 10° C./min, and the Tg determined therefrom.

Comparing the two Tables 1 and 2 it is apparent that the reactivity of the 1,1-dimethylurea acting as accelerator is entirely comparable with that of the standard accelerators of the uron series. This is also true, to a somewhat lesser extent, for the 1,1-diethylurea. The glass transition temperature of the material cured with dialkylurea accelerators, as well, is within the range of the values achievable with the standard accelerators Dyhard UR 200 and UR 300. Particularly when relatively large amounts of accelerator are added, the tendency toward Tg reduction in the case of the materials of the invention is less strongly pronounced.

Example 2

Latency Experiments:

A formulation of 100 parts by weight of bisphenol A epoxy resin (Epikote 828, EEW 185) and 6.5 parts by weight of Dyhard 100 S was admixed in each case with the amounts of latent accelerators indicated in Tables 3 and 4. After the stated storage period at the respective temperature (40° C. or 23° C.) a measurement was made in each case of the viscosity, using a Haake viscometer. The viscosity values are shown in columns 3-8 of Tables 3 and 4.

TABLE 1

| Expt. | Components (parts by wt.) | DSC (peak) | DSC (onset) | Gel time at 150° C. | Gel time at 120° C. | Tg |
|---|---|---|---|---|---|---|
| 1.1 | Resin:Dyh100S:1,1-DMH 100:6:1 | 163, 7° C. | 153, 2° C. | 3 min. 33 sec. | 28 min | 140, 3° C. |
| 1.2 | Resin:Dyh100S:1,1-DMH 100:6:3 | 154, 6° C. | 142, 4° C. | 2 min. 40 sec. | 13 min. 30 sec. | 127, 1° C. |
| 1.3 | Resin:Dyh100S:1,1-DMH 100:6:5 | 150, 8° C. | 137, 2° C. | 2 min. 01 sec. | 10 min. | 120, 3° C. |
| 1.4 | Resin:Dyh100S:1,1-DEH 100:6:1 | 180, 3° C. | 171, 2° C. | 10 min. 07 sec. | 56 min. | 152, 4° C. |
| 1.5 | Resin:Dyh100S:1,1-DEH 100:6:3 | 174, 5° C. | 165, 1° C. | 6 min. 28 sec. | 35 min. | 131, 8° C. |
| 1.6 | Resin:Dyh100S:1,1-DEH 100:6:5 | 170, 7° C. | 160, 5° C. | 5 min. 13 sec. | 28 min. | 118, 0° C. |

TABLE 2

Examples (not inventive):

| Expt. | Components (parts by wt.) | DSC (peak) | DSC (onset) | Gel time at 150° C. | Gel time at 120° C. | Tg |
|---|---|---|---|---|---|---|
| 1.7 | Resin:Dyh100S:UR200 100:6:1 | 160, 7° C. | 151, 1° C. | 2 min. 47 sec. | 12 min. | 150, 4° C. |
| 1.8 | Resin:Dyh100S:UR200 100:6:3 | 154, 0° C. | 145, 9° C. | 2 min. 06 sec. | 8 min. | 134, 7° C. |
| 1.9 | Resin:Dyh100S:UR200 100:6:5 | 150, 9° C. | 143, 5° C. | 1 min. 57 sec. | 7 min. | 123, 2° C. |
| 1.10 | Resin:Dyh100S:UR300 100:6:1 | 157, 6° C. | 149, 3° C. | 2 min. 23 sec. | 12 min. | 146, 2° C. |
| 1.11 | Resin:Dyh100S:UR300 100:6:3 | 152, 1° C. | 144, 9° C. | 1 min. 51 sec. | 7 min. 30 sec. | 130, 7° C. |
| 1.12 | Resin:Dyh100S:UR300 100:6:5 | 148, 8° C. | 142, 0° C. | 1 min. 51 sec. | 5 min. 30 sec. | 118, 4° C. |

TABLE 3

| Expt. | Storage period at 40° C. (d) | 1 part by wt. 1,1-DMH (Pa*s) | 3 parts by wt. 1,1-DMH (Pa*s) | 5 parts by wt. 1,1-DMH (Pa*s) | 1 part by wt. MDI uron (Pa*s) | 3 parts by wt. MDI uron (Pa*s) | 5 parts by wt. MDI uron (Pa*s) |
|---|---|---|---|---|---|---|---|
| 2.1 | 0 | 43 | 45 | 47 | 51 | 72 | 89 |
| 2.2 | 4 | 40 | 43 | 50 | 53 | 57 | 58 |
| 2.3 | 8 | 37 | 43 | 47 | 63 | 68 | 76 |
| 2.4 | 11 | 38 | 43 | 49 | 72 | 88 | 96 |
| 2.5 | 15 | 42 | 41 | 50 | 102 | 117 | 130 |
| 2.6 | 18 | 46 | 51 | 53 | | | |
| 2.7 | 22 | 54 | 49 | 62 | 212 | 347 | 508 |
| 2.8 | 25 | 55 | 58 | 56 | solid | solid | solid |
| 2.9 | 29 | 67 | 64 | 61 | | | |
| 2.10 | 32 | 63 | 66 | 60 | | | |
| 2.11 | 39 | 87 | 73 | 81 | | | |
| 2.12 | 43 | 160 | 102 | 101 | | | |
| 2.13 | 46 | 217 | 133 | 106 | | | |
| 2.14 | 50 | 545 | 143 | 116 | | | |
| 2.15 | 53 | 618 | 190 | 137 | | | |
| 2.16 | 57 | solid | 348 | 230 | | | |
| 2.17 | 60 | | 421 | 298 | | | |
| 2.18 | 64 | | solid | 445 | | | |
| 2.19 | 67 | | | 471 | | | |

As is clearly apparent from Table 3, the formulations of the invention have considerably better properties with regard to latency: while a doubling of the viscosity occurs in formulations with MDI uron at 40° C. after only 15 days, with 1,1-dimethylurea this is the case only after approximately 40 days. For MDI uron the processability of the formulation is below 25 days, while for formulations with 1,1-dimethylurea it is more than twice as high (more than 50 days).

TABLE 4

| Expt. | Storage period at 23° C. (d) | 1 part by wt. 1,1-DMH (Pa*s) | 3 parts by wt. 1,1-DMH (Pa*s) | 5 parts by wt. 1,1-DMH (Pa*s) | 1 part by wt. MDI uron (Pa*s) | 3 parts by wt. MDI uron (Pa*s) | 5 parts by wt. MDI uron (Pa*s) |
|---|---|---|---|---|---|---|---|
| 2.20 | 0 | 43 | 45 | 47 | 52 | 73 | 85 |
| 2.21 | 6 | 45 | 48 | 51 | 83 | 90 | 96 |
| 2.22 | 13 | 52 | 55 | 59 | 105 | 125 | 125 |
| 2.23 | 20 | 50 | 57 | 63 | 148 | 180 | 182 |
| 2.24 | 28 | 66 | 67 | 86 | solid | solid | solid |
| 2.25 | 35 | 66 | 74 | 106 | | | |
| 2.26 | 41 | 111 | 119 | 124 | | | |
| 2.27 | 48 | 157 | 182 | 234 | | | |
| 2.28 | 55 | 186 | solid | solid | | | |
| 2.29 | 62 | 234 | | | | | |

The processability of the formulations comprising 1,1-dimethylurea is likewise considerably higher at room temperature than in formulations with MDI uron.

Example 3

Comparison of N,N-dimethylurea With Various Standard Accelerators (MDI Uron, UR 300 and UR 500):

Formulations are produced which are composed in each case of 100 parts by weight of bisphenol A epoxy resin (Epikote 828, EEW 185), 6.5 parts by weight of Dyhard 100 S, and the amount of the respective accelerator indicated in Table 5. After the storage period at 40° C. indicated in the second column, the viscosity was determined in each case, using a Haake viscometer. The viscosity values are shown in columns 3-6 of Table 5.

TABLE 5

| Expt. | Storage period at 40° C. (d) | 3 parts by wt. 1,1-DMH (Pa*s) | 3 parts by wt. MDI uron (Pa*s) | 3 parts by wt. UR 300 (Pa*s) | 3 parts by wt. UR 500 (Pa*s) |
|---|---|---|---|---|---|
| 3.1 | 0 | 45 | 72 | 45 | 52 |
| 3.2 | 4 | 43 | 57 | 52 | 120 |
| 3.3 | 8 | 43 | 68 | solid | solid |
| 3.4 | 11 | 43 | 88 | | |
| 3.5 | 15 | 41 | 117 | | |
| 3.6 | 18 | 51 | | | |
| 3.7 | 22 | 49 | 347 | | |
| 3.8 | 25 | 58 | solid | | |
| 3.9 | 29 | 64 | | | |
| 3.10 | 32 | 66 | | | |
| 3.11 | 39 | 73 | | | |
| 3.12 | 43 | 102 | | | |
| 3.13 | 46 | 133 | | | |
| 3.14 | 50 | 143 | | | |
| 3.15 | 53 | 190 | | | |
| 3.16 | 57 | 348 | | | |
| 3.17 | 60 | 421 | | | |
| 3.18 | 64 | solid | | | |

In comparison with standard accelerators of the uron series the advantage of using 1,1-dimethylurea in one-component mixtures becomes even more distinct: while the standard products UR 300 and UR 500 can be processed only for up to 1 week at 40° C., a formulation with MDI uron can be processed for at least 3 weeks. The formulation comprising dimethylurea, indeed, can be processed for 7 to 8 weeks.

Example 4

Powder Coating Examples:

Formulations A, B, C and D below, consisting of the components indicated in Table 6, were compared with one another:

TABLE 6

| | A | B | C | D |
|---|---|---|---|---|
| DER 664UE, EEW 910 | 180 g | 180 g | 180 g | 180 g |
| TiO2 | 90 g | 90 g | 90 g | 90 g |

TABLE 6-continued

| | A | B | C | D |
|---|---|---|---|---|
| Lanco Wax TPS-040 | 3 g | 3 g | 3 g | 3 g |
| Dicyandiamide | | | | 6 g |
| Dyhard 100 S | 9 g | 9 g | 9 g | |
| Dyhard UR 300 | — | — | 4.5 g | — |
| Dyhard UR 500 | 4.5 g | — | — | — |
| 1,1-DMH | — | 4.5 g | — | — |
| Dyhard MIA 5 | | | | 1.5 g |

The formulations were each extruded at 95° C.

For the production of the corresponding powder coating materials, the raw materials in powder form were each pre-mixed, extruded for better homogenization at 95° C., then ground, and subsequently applied by spray gun to steel plates in film thicknesses of between 60 to 80 μm and cured or crosslinked at two different temperatures (180 and 200° C.). The results of the tests on the cured powder coating formulations are depicted in Table 7.

TABLE 7

| | A 180° C. | A 200° C. | B 180° C. | B 200° C. | C 180° C. | C 200° C. | D 180° C. | D 200° C. |
|---|---|---|---|---|---|---|---|---|
| Film thickness (μm) | 78 | 73 | 80 | 82 | 83 | 77 | 65 | 66 |
| Leveling | good | good | good | good | good | good | orange peel | orange peel |
| Gloss (60°) | 73.2 | 72.7 | 61 | 63.2 | 67.1 | 68.1 | 84.6 | 93.4 |
| Whiteness | 89 | 85.3 | 90.3 | 89.3 | 90.8 | 89.5 | 85.5 | 80.8 |
| Yellowness | −0.52 | 3.7 | −1.6 | 0.44 | −1.9 | −0.54 | 2.1 | 7 |
| Erichsen mm | 8.4 | 7.2 | 8.4 | 8.3 | 8.4 | 8.4 | 8.4 | 8.4 |
| Mandrel bending mm | <5 | <5 | <5 | <5 | <5 | <5 | <5 | <5 |
| Ball impact inch | 120 | 120 | 120 | 120 | 120 | 120 | 120 | 120 |

The mechanical properties of the accelerators of the invention in powder coating formulations are absolutely comparable with those of the prior-art methylimidazole adduct (Dyhard MIA 5), with at the same time a lower yellowing tendency and better leveling properties.

The invention claimed is:

1. An epoxy resin system consisting of an epoxy resin selected from the group consisting of an unhalogenated or halogenated bisphenol A or bisphenol F epoxy resin, a resorcinol epoxy resin and a tetrikisphenylolethane epoxy resin, dicyandiamide as a latent hardener for the epoxy resin, and N,N-dimethylurea as an accelerator.

2. The epoxy resin system of claim 1, characterized in that N,N-dimethylurea is used in an amount of 0.5% to 15% by weight, based on the epoxy resin.

3. The epoxy resin system of claim 1, characterized in that the dicyandiamide is used in an amount of 1% to 15% by weight, based on the epoxy resin.

4. The epoxy resin system of claim 1, characterized in that the curing reaction of the epoxy resin system is carried out at temperatures between 70 and 220° C.

5. The epoxy resin system of claim 1, characterized in that the curing reaction of the epoxy resin system is carried out at temperatures between 80 and 160° C.

6. The epoxy resin system of claim 1, characterized in that N,N-dimethylurea and the dicyandiamide have an average particle size of 0.5 to 100 µm.

7. The epoxy resin system of claim 1, characterized in that N,N-dimethylurea is used in combination with dicyandiamide as latent hardener for the hot curing of epoxy resin in the sector of fiber composites, powder coatings, electrical laminates, and adhesives.

* * * * *